E. A. SPERRY.
WIRELESS REPEATER SYSTEM.
APPLICATION FILED MAR. 12, 1920.
1,428,507.
Patented Sept. 5, 1922.
3 SHEETS—SHEET 2.
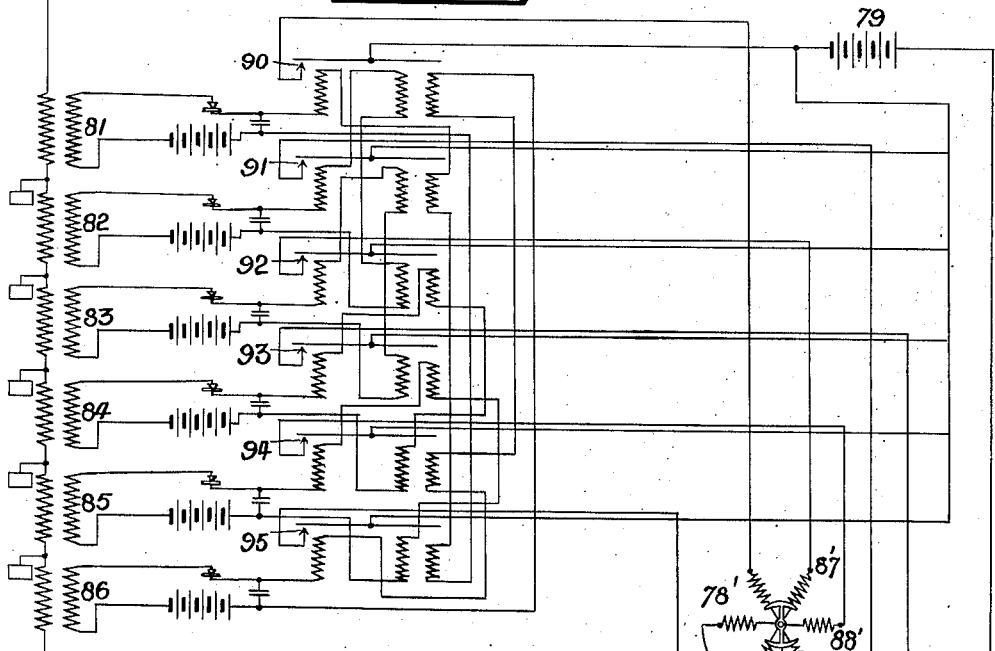
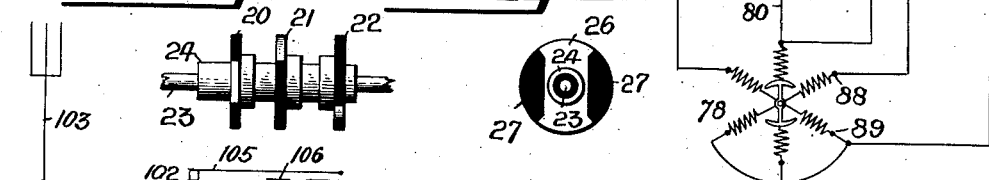
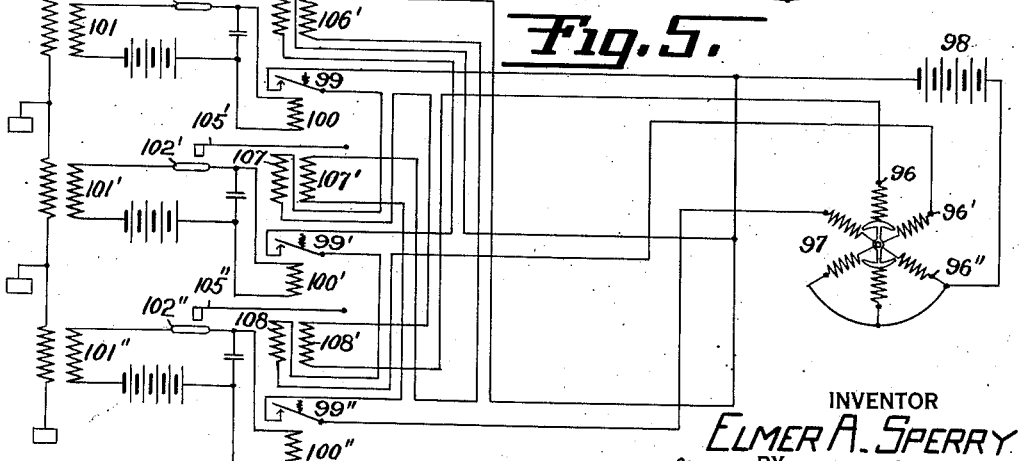
INVENTOR
ELMER A. SPERRY
BY
Herbert H. Thompson
HIS ATTORNEY

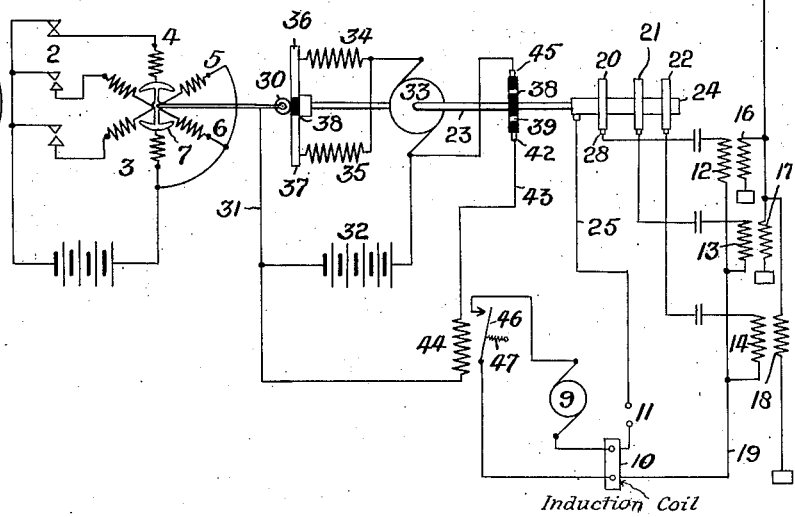
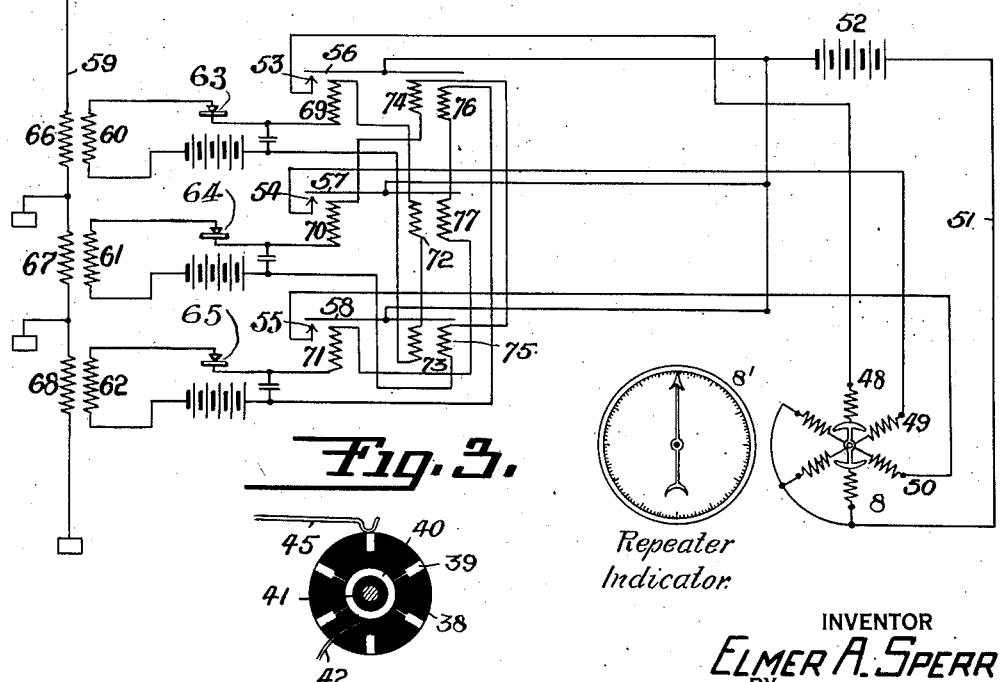

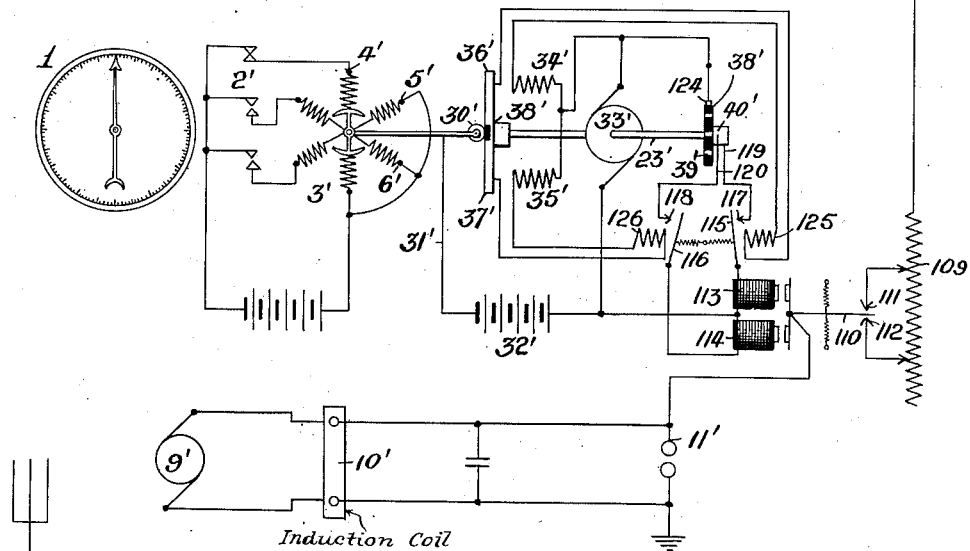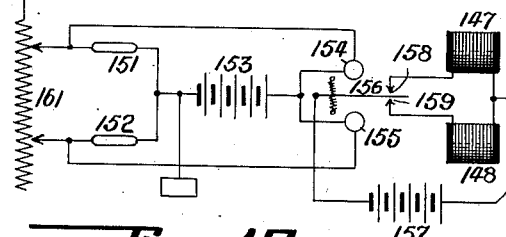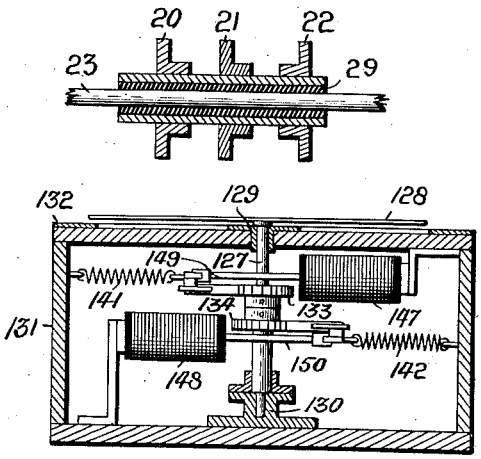

Patented Sept. 5, 1922.

1,428,507

UNITED STATES PATENT OFFICE.

ELMER A. SPERRY, OF BROOKLYN, NEW YORK.

WIRELESS REPEATER SYSTEM.        REISSUED

Application filed March 12, 1920. Serial No. 365,144.

*To all whom it may concern:*

Be it known that I, ELMER A. SPERRY, a citizen of the United States of America, residing at 1505 Albermarle Road, Brooklyn, New York, in the county of Kings and State of New York, have invented certain new and useful Improvements in Wireless Repeater Systems, of which the following is a specification.

This invention relates to means for automatically transmitting the readings of an indicating member by wireless to a distant point. My invention is particularly useful in automatically transmitting by wireless to an aircraft or other distant point the readings of a compass, fire control instrument, or other indicator on board a ship, whereby the ship's heading or the bearing of a target observed from the ship may be constantly communicated to such distant point. Such a system has especial uses in the aerial ordnance control for heavy guns where the target is only visible from airplanes, which signal to the ship or other firing station the bearings of the target. In such a system it is very desirable that the airplane pilot know the bearing of the ship, guns, etc.

The chief object of my invention is to provide simple and efficient means for causing an indicator by means of radiant impulses to follow automatically the movements of another indicator at a distant point and especially adapted for the use outlined above. Other objects and advantages will become apparent as the description of my invention proceeds.

Referring to the drawings wherein I have shown what I now consider the preferred forms of my invention:

Fig. 1 is a diagrammatic view of one form of transmitting apparatus showing the wiring therefor.

Fig. 2 is a wiring diagram of a receiving apparatus for use in connection with the transmitting apparatus of Fig. 1.

Fig. 3 is a view of a detail.

Fig. 4 is a wiring diagram showing another form of receiving apparatus.

Fig. 5 is a wiring diagram showing still another form of receiving apparatus.

Fig. 6 is a diagrammatic view of one form of transmitting apparatus showing the wiring therefor.

Fig. 7 is a diagrammatic view of a receiving apparatus for use with the transmitting apparatus of Fig. 6.

Fig. 8 is a plan view of an indicating apparatus for use in connection with the receiving apparatus of Fig. 7, the top of the containing casing being removed.

Fig. 9 is a view in elevation of parts of the indicating apparatus of Fig. 8, the casing therefor being shown in section.

Figs. 10, 11, and 12 are views of details.

In Fig. 1 I have shown at 1 a conventional indicating instrument, which may be a rotatable compass card or fire control indicator. Actuated by this indicator in a manner well known in the art is a transmitter 2 electrically connected with a repeater motor 3. The transmitter 2 and repeater 3 may be of a type well known in the art, such as shown in the patent to Elmer A. Sperry Serial No. 1,296,440, issued March 4, 1919, for "repeater system for gyro-compasses", or in the application for patent by Elemer Meitner, Serial No. 227,680, filed April 10, 1918, for "self-setting transmission system". The repeater motor may be of the six pole type having three sets of coils 4, 5, and 6, and an armature 7.

For communicating to a distant point the indications or steps of the armature of repeater motor 3, I have provided means whereby, as the respective sets of coils of repeater 3 are energized, radiant impulses of different frequencies are sent, each of which frequencies corresponds to one set of coils of a repeater motor 8 at said distant station. Various means may be provided for transmitting wireless impulses of different frequencies in accordance with the particular coils of repeater 3 which are energized. One form of such means is shown in Fig. 1 and may be constructed substantially as follows:

The wireless sending apparatus may be of any conventional type. For instance, it may comprise a source 9 of E. M. F., connected to an induction coil 10, to the secondary of which are connected spark gap 11 and a plurality of inductances 12, 13, and 14 of different values corresponding to different frequencies of the radiant impulses. By means to be described later only one of said coils or inductances at a time is placed in circuit with the source of E. M. F. Each coil may cooperate with an open oscillatory circuit consisting of an antenna 12 and earthed coils 16, 17, and 18 cooperating with coils 12, 13, and 14, respectively.

The means for placing coils 12, 13, and 14 successively in circuit with generator 9 may take various forms, one of which is shown in Fig. 1, and, more in detail, in Figs. 10, 11, and 12. Said coils are shown each connected at one end with a wire 19 leading to one terminal of the induction coil and at their other ends with brushes 28 engaging members 20, 21, and 22, respectively. The latter members are shown in Figs. 10 and 12 mounted on conducting sleeve 24 on shaft 23, which sleeve is connected by wire 25 with the induction coil. Each of said members comprises a double contact portion 26 and insulation portions 27 as shown in Fig. 11. The contact portions of members 20, 21, and 22 are in engagement with sleeve 24 and may be so arranged that when a contact portion of one member passes out from under its cooperating brush, a contact portion of the next contact will come under its corresponding brush, and so on. Sleeve 24 is shown separated by insulation 29 from shaft 23. From the construction above described it will now be evident that, if shaft 23 be rotated to follow the movements of repeater 3, and the contact portions of members 20, 21, and 22 be suitably arranged with respect to said shaft, one of coils 12, 13, and 14 corresponding with the particular set 4, 5, or 6 of the coils of repeater 3 which is energized, will be connected in the sending circuit. Shaft 23 might be connected directly with the armature of repeater motor 3, but owing to the possibility of the motor falling out of step if overloaded, I prefer to employ in connection therewith a follow-up system.

As shown in Fig. 1, the aforesaid follow-up system may comprise a trolley 30 rotatable with the armature of repeater motor 3 and connected by a conductor 31 with one terminal of a battery 32 or other source of E. M. F., the other terminal of which source of E. M. F. may be connected with one terminal of a motor 33. The other terminal of the motor may be connected as shown with oppositely wound field coils 34 and 35, which coils are connected at their other ends with contact portions 36 and 37 respectively of a drum 38 fixed to shaft 23. The latter shaft is driven by the motor 33. When armature 7 is at rest, trolley 30 rests on a strip of insulation between contact portions 36 and 37. When, however, said armature moves in one direction or the other, it will be evident that current will flow through motor 33 and one or the other of field coils 34, 35 thereby causing motor 33 to turn in such direction as to bring the aforesaid strip of insulation again under trolley 30. Shaft 23 and the contact members mounted thereon are thus turned to follow-up the movements of repeater motor 3.

For causing a wireless impulse to be sent each time that armature 7 moves through one step I may utilize means arranged substantially as follows: On shaft 23 is a member 38 of insulating material having a plurality of contact segments 39 arranged at suitable portions along its periphery and a conducting hub 40 insulated from shaft 23 by means of a sleeve 41. In the example shown, six contact segments 39 are provided and are suitably connected to conducting hub 40. The latter is engaged by a brush 42 connected by conductor 43 to a relay magnet coil 44, which coil is connected as shown to one terminal of battery 32. The other terminal of said battery is shown connected with a brush 45 in engagement with the periphery of member 38. The armature 46 of relay coil 44 is shown adapted to close a circuit through generator 9 and induction coil 10 when said armature is attracted by said coil. Normally the armature is held by a spring 47 in a position in which the aforesaid circuit is open.

The operation of the above described apparatus will now be readily understood. As indicator 1 turns, transmitter 2 is actuated and armature 7 and trolley 30 are caused to move step-by-step. As armature 7 commences to turn through a step, motor 33 is energized to turn shaft 23 through the same step or angle as armature 7 turns. Preferably, contact segments 39 of member 38 are so arranged that the circuit through coil 44 is closed at some point during the turning of shaft 23 through said step or angle and opened again by the time the turning through said step has been completed, since if said circuit is closed at the exact time that turning through said step is completed, impulses will be sent continuously until the shaft 23 again commences to turn. At the time the circuit through coil 44 is closed, the contact portion of the proper one of members 20, 21, and 22 has been brought under its cooperating brush so that that one of coils 12, 13, and 14 which corresponds with the energized set of repeater coils is connected in the wireless sending circuit. Consequently an impulse of a frequency corresponding to the aforesaid set of repeater coils will have been sent by the time shaft 23 has been turned through an angle corresponding to that through which armature 7 has turned. In other words, for each step of said armature, an impulse corresponding in frequency with the set of repeater coils energized is sent. I have shown six contact segments on member 38, whereby the circuit of the wireless transmission system will be closed six times during one revolution of the repeater. It is evident, however, that, where the repeater has twelve steps per revolution, as is the case in the patent to Sperry aforementioned, twelve contacts might be arranged on member 38, whereby twelve wireless impulses per revolution of the repeater motor would be transmitted. Of course, if desired, six contacts, as shown, may be used even where the repeater motor has twelve steps, with the result that six impulses per revolution would be sent, one for each two steps.

I have shown for purposes of illustration the wireless transmitting apparatus as controlled indirectly from the master indicating instrument 1 through the medium of one of the repeaters connected with said instrument. It will, however, be obvious that the shaft 23 can be driven directly by indicator 1 in the same manner as transmitter 2, and that transmitter 2, repeater 3, and the follow-up motor may be omitted from the connection between said indicator and said shaft.

In Fig. 2 I have shown one form of wireless receiving means adapted to cause the energization of the proper set of coils of a repeater motor 8 according to the frequency of the impulses received. Each set 48, 59, and 50 of the repeater coils is shown connected at one end to a common conductor 51 leading to one terminal of a source 52 of E. M. F. The sets of coils may be connected at their other ends with contacts 53, 54, and 55, respectively, of certain polarized relays which contacts are adapted to be engaged by the relay armatures 56, 57, and 58. Said armatures are shown connected with the other terminal of source 52 of E. M. F. Repeater motor 8 may be geared or otherwise connected, as is well known in the art, with a repeating indicator 8'.

A conventional open oscillatory circuit is shown at 59, coupled with which are a plurality of closed oscillatory circuits including coils 60, 61, and 62. In circuit with said coils are suitable detectors of electrical oscillations, such detectors being indicated at 63, 64, and 65. Coils 60, 61, and 62 cooperate with earthed coils 66, 67, and 68 of the aforesaid open oscillatory circuit and are each responsive to a different one of the frequencies sent by the transmitter magnet. Coils 69, 70, and 71 are interposed in the closed oscillatory circuits as shown and are adapted to attract armatures 56, 57, and 58, respectively, to close circuits through the sets of coils of the repeater motor 8.

Inasmuch as the armatures of the conventional repeater motors of the type shown are not polarized, it follows that the repeater may easily fall out of step with the transmitter if none of the coils of the repeater are energized, since the armature and indicator movable thereby are then free to take up positions in response to various external forces. Accordingly I have provided the polarized relays shown so that when one of said relays is energized it will close a circuit through the corresponding set of repeater coils and maintain such circuit closed until another set of coils is energized. The armatures 56, 57, and 58 may be polarized in any suitable and conventional manner. In series with coil 69 are coils 72 and 73 adapted, when energized, to withdraw armatures 57 and 58 from engagement with their respective contacts. Likewise, in series with coil 70 are coils 74 and 75 adapted to withdraw armatures 56 and 58, while in series with coil 71 are coils 76 and 77 adapted to withdraw armatures 56 and 57.

The operation of the above described receiving apparatus will now become evident. Assuming that an impulse is sent of a frequency corresponding to repeater coils 4 and to which coil 60 and detector 63 are responsive, coils 69, 72, and 73 are energized. Armature 56 is thus attracted to cause energization of set 48 of the repeater coils and simultaneously armatures 57 and 58 are kept out of engagement with their respective contacts. While the impulse may be of only brief duration, armature 56, being polarized, will remain in engagement with contact 53 and keep set 48 of the repeater coils energized. Said set of coils will remain energized until an impulse of a different frequency is sent. Thus, if an impulse of a frequency to which coil 61 is responsive is sent, such frequency corresponding with repeater coils 5, armature 56 will be withdrawn from engagement with contact 53 and simultaneously coil 70 will be energized to attract armature 57 and cause energization of set 49 of the repeater coils. If, on the other hand, an impulse of a frequency to which coil 62 is responsive and corresponding with repeater coils 6 were sent, armature 56 would be withdrawn from engagement with contact 53 and simultaneously coil 71 would be energized to attract armature 58 to cause energization of set 50 of the repeater coils. In this manner the armature of repeater motor 8 will be maintained in synchronism with motor 3 and indicator 1.

In Fig. 4 I have shown an alternative arrangement whereby twelve steps per repeater rotation may be obtained at the receiving station. In this case, two six pole repeater motors 78 and 78' may be so connected with the shaft 80, which actuates a suitable indicator, that the coils of one are displaced thirty degrees with respect to the corresponding coils of the other. Thus, if the sets of coils of one motor are energized in between the energizations of the sets of coils of the other motor, the shaft 80 will be moved through steps of thirty degrees each. For causing the coils of the aforesaid motors to be energized in the proper sequence I have shown connections similar to those shown in Fig. 2, except that six closed oscillatory circuits, including coils 81 to 86, responsive to different frequencies, are provided. In this case it is obvious that twelve impulses per revolution of the repeater 3 should be sent, as by providing twelve contact segments on member 38. Also, it will be evident, that six different frequencies should be provided in the transmitting apparatus in place of the three shown, the frequencies corresponding to successive steps of the repeater through 180°. Inasmuch as it will be obvious to those skilled in the art, after inspection of Fig. 1, how six different inductances in place of three may be connected in the transmission circuit to obtain the desired results, further illustration is thought unnecessary.

The sets of coils of repeater 78 I have designated as 87, 88, and 89, while those of repeater 78' are designated as 87', 88', and 89'. As shown, sets 87, 88, and 89 are connected at one end to one terminal of battery 79 and the other ends of said sets of coils are connected with contacts 91, 93, and 95. Sets of coils 87', 88', and 89' are likewise connected at one end with the aforesaid terminal of battery 79 and the other ends of said coils are connected with contacts 92, 94, and 90. Contacts 90 to 95, inclusive, are adapted to be engaged by armatures of polarized relays of the type shown in Fig. 2, said armatures being connected with the other terminal of battery 79.

The operation of the construction shown in Fig. 4 will now be readily apparent. Assuming that coils 4 of motor 3 are energized and that an impulse of a frequency corresponding thereto is sent, to which frequency coil 82 is responsive, the armature which cooperates with contact 91 will be attracted to close a circuit through coils 87 of the repeater 78. If now, coils 5 of repeater motor 3 are energized while coils 4 remain energized the armature of said motor will move through thirty degrees and an impulse of a frequency to which coil 83 is responsive will be sent. A circuit through coils 87' of motor 78' will thereupon be closed and simultaneously therewith the circuit through coils 87 of motor 78 will be broken. If, on the other hand, while coils 4 remain energized, coils 3 had been energized, an impulse to which coil 81 is responsive would have been sent, which would have resulted in the simultaneous closing of a circuit through coils 89' of repeater motor 78' and breaking of the circuit through coils 87 of repeater motor 78. The indicator actuated by motors 78 and 78' may thus be moved step-by-step in either direction and kept in synchronism with indicator 1.

In Fig. 5 I have shown another form of my invention. In this figure sets 96, 96' and 96'' of the coils of repeater motor 97 are shown connected at one end with one terminal of battery 98. The other ends of said coils are shown connected with relay armatures, 99, 99', and 99'', respectively, which armatures are adapted to be attracted to engage contacts connected with the other terminal of battery 98. The armatures may be normally biased by springs, as shown, to a position in which the respective circuits through the repeater coils are open. When, however, one of relay coils 100, 100', and 100'' is energized, the corresponding armature will be attracted to close a circuit through the corresponding repeater coils, and said armature will remain in its attracted position as long as current flows through the relay coil. Coils 100, 100', and 100'' may be connected in closed oscillatory circuits including inductances 101, 101', and 101'', and coherers 102, 102', and 102'', the aforesaid inductances being responsive to different frequencies and the aforesaid oscillatory circuits cooperating with open oscillatory circuits comprising antenna 103, as shown. Adjacent the coherers are decoherers. Each decoherer is arranged to be actuated to render its corresponding coherer non-conducting when either of the circuits controlled by the other coherers and their corresponding relays is closed. While the decoherers may assume various forms I have herein shown them as respectively comprising tappers 105, 105', and 105'', which are adapted to be attracted to tap the respective coherers. Magnet coils 106, 106', are shown cooperating with tapper 105, the former coil being in circuit with repeater coils 96' and the latter with repeater coils 96''. Similarly associated with tapper 105' are coil 107 in circuit with repeater coils 96 and coil 107' in circuit with repeater coils 96'', while associated with tapper 105'' are coil 108 in circuit with repeater coils 96 and coil 108' in circuit with coils 96'. Assuming that coils 4 of repeater 3 are energized and that an impulse of a frequency to which coil 101 is responsive is sent, it will be seen that armature 99 will be attracted to close a circuit through repeater coils 96 and that simultaneously tappers 105' and 105'' will be attracted to render coherers 102' and 102'' non-conducting. Armature 99 will now remain attracted until coherer 102 is tapped to render it non-conducting. If, now, coils 5 of repeater 3 are energized, with the consequent sending of an impulse of a frequency to which coil 101' is responsive, armature 99' will be attracted to close a circuit through repeater coils 96' and simultaneously therewith tappers 105 and 105'' will be attracted. Coherer 102 being thereby rendered non-conducting current will cease to flow through relay coil 100, and armature 99 will be retracted by its spring to break the circuit through repeater coils 96. If, on the other hand, coils 6 of repeater 3 had been energized, armature 99'' would have been attracted to close a circuit through coils 96'' and tappers 105 and 105' would have been attracted, with the result that armature 99 would have been retracted to break the circuit through repeater coils 96. Thus, when a set of the coils of repeater 97 is energized, said set remains energized until the next set is energized whereupon the first set is simultaneously deenergized. It is thus evident that, when synchronism between repeaters 3 and 97 is once established it will be automatically maintained.

In Figs. 6–9, inclusive, I have illustrated another form of my invention wherein impulses of only two different frequencies need be utilized to reproduce at a distant point the movements of an indicator. In Fig. 6, the parts corresponding with similar parts in Fig. 1 are designated by the same numerals with a prime added. As has been heretofore indicated, it is immaterial what particular form of wireless transmitting and receiving apparatus is employed and it is evident that various types of apparatus may be utilized. In the form shown diagrammatically in Fig. 6, different frequencies may be obtained by throwing more or less of tuning coil 109 into circuit by actuating contact arm 110 to engage one or the other of contact points 111, 112. For actuating arm 110 to cause an impulse of the proper frequency to be sent at the correct time I may employ apparatus constructed and arranged substantially as follows:

Cooperating with arm 110, as shown, are solenoids or magnets 113, 114 which may be connected at one end with one terminal of battery 32' and at their other ends with armatures 115, 116, respectively, which armatures are adapted to engage contacts 117, 118. The latter contacts may be connected as shown with brushes 119, 120, respectively, which brushes engage the conducting hub portion 40' of a member 38' mounted on and insulated from shaft 23'. Member 38' is similar to member 38 of Fig. 3 and is provided with conducting segments 39' electrically connected with hub 40' and insulated from each other. I prefer to provide twelve segments 39' corresponding with twelve steps per revolution of the repeater 3', but, of course, the number of such segments may be varied as desired. Adapted to cooperate with the aforesaid contact segments successively is a brush member 124 which may be connected in any suitable way with the battery 32'. It follows from the structure above described that, if brush 124 be engaged with a segment 39' and if one or the other of armatures 115, 116 be attracted to engage its corresponding contact, a circuit will be closed through the corresponding one of solenoids 113, 114, whereupon an impulse of corresponding frequency will be sent. For attracting the above mentioned armatures, I have shown magnet coils 125, 126, which may be in circuit with field coils 35', 36', respectively. Thus, when motor 33' turns in one direction, impulses of one frequency may be sent, and, when said motor turns in the other direction, impulses of another frequency may be sent.

From the above described construction it will be apparent that, as long as the repeater motor 3' moves in one direction, current will flow through one of coils 125, 126, thereby attracting the corresponding armature. If, now, contact segments 39' be properly arranged on the periphery of member 38', it will be seen that, during each step of repeater motor 3', a circuit will be closed through one or the other of solenoids 113, 114 and an impulse of a frequency corresponding to the direction in which the motor turns will be sent. The length of each contact segment 39' may, of course, be varied as desired in order that impulses of the desired duration may be sent.

One form of indicating means at the receiving station, for use in connection with a transmitting system of the type just described, is shown in Figs. 8 and 9 and may be constructed substantially as follows:

An indicator shaft 127, which may carry an indicator 128, may be mounted in bearings 129, 130 in a casing 131. Indicator 128 may cooperate with a suitable scale 132. Of course shaft 127 may actuate a repeating indicator through reduction gearing or otherwise, as is well known in the art. Mounted fixedly on shaft 127 are ratchet wheels 133, 134, having oppositely directed teeth. Each ratchet wheel is, in the example shown, provided with twelve teeth corresponding with twelve steps of repeater motor 3'. For actuating said ratchet wheels I have shown pawls 135, 136, pivoted to the ends of members 137, 148, respectively, which members are in turn suitably pivoted at their other ends to brackets 139, 140 in casing 131. Springs 141, 142, interposed between members 137, 138, and casing 131, serve to retract pawls 135, 136 from engagement with the corresponding ratchets. Said pawls are preferably biased by springs 143, 144 towards engagement with the teeth of the corresponding wheels, and, when retracted, the pawls may be engaged with suitable stop members 145, 146, respectively. For actuating members 137, 138 I have shown electromagnets or solenoids 147, 148, the armatures 149, 150 of which solenoids are connected with the aforesaid members. It will now be seen that, when one or the other of magnets or solenoids 147, 148 is energized, one or the other of pawls 135, 136 will be pushed into engagement with the corresponding ratchet wheel to turn shaft 127 through one step in the desired direction. When current ceases to flow through said solenoid, the pawl will be retracted by the corresponding one of springs 141, 142 into a position out of the path of its ratchet wheel. It will now be seen that if solenoids 147, 148 are so connected in the wireless receiving circuit that, when impulses of one frequency are sent, one solenoid is energized, and when impulses of another frequency are sent, the other solenoid is energized, indicator 128 will follow the movements of repeater motor 3'. One of the various forms which said circuit connections may assume is shown in Fig. 7.

In Fig. 7, 160 is an antenna and 161 a suitable tuning device. 151 denotes a suitable detector which is influenced by impulses transmitted when, for example, contact arm 110 is in engagement with contact point 111, and 152 is a detector which is influenced when contact arm 110 is in engagement with contact point 112. In circuit with said detectors are shown a battery 153 and relay magnets 154, 155. Controlled through relay armature 156, are solenoids 147, 148 said solenoids being shown in circuit with a battery 157, and relay contacts 158, 159, respectively.

The operation of the form of my invention shown in Figs. 6, 7, 8, and 9 will now clear. For each step of repeater motor 3' in one direction, one of solenoids 147, 148 will be energized, and indicator 128 moved through one step each time that said solenoid is energized. Likewise, when repeater motor 3' moves in the reverse direction, the other of solenoids 147, 148 is energized and deenergized during each step of the repeater motor, and indicator 128 is thereby moved in the reverse direction. It will thus be apparent that indicator 128 will be maintained in step with repeater motor 3'. While a suitable brake of any desired type may be provided in connection with shaft 127 to prevent accidental movement of said shaft when no impulses are being sent, I have not illustrated such brake since it is evident that the same result may be obtained by providing sufficient friction between the shaft and its bearings.

While I have chosen for purposes of illustration to show shaft 127 as actuating an indicator it will be evident to those skilled in the art that said shaft may carry transmitter contacts or otherwise actuate a transmitter, which transmitter may be electrically connected with the usual repeating indicator. These connections are well known in the art, as shown in the Sperry patent or the Meitner application above referred to, and hence it is thought unnecessary to show them in connection with shaft 127. Various other modifications of my invention will readily occur to those skilled in the art.

Inasmuch as ships and aircraft are commonly provided with antennæ for wireless telephone purposes, it will be evident that the same antennæ, as well as other parts of the wireless apparatus, may be utilized in connection with my wireless repeater system. Hence no additional antennæ are necessary. The wireless telephone apparatus could, of course, operate with impulses of the usual or normal frequency, and additional frequencies may easily be provided, as, for example, in the manner above disclosed, for the operation of the repeater system.

In accordance with the provisions of the patent statutes, I have herein described the principle of operation of my invention, together with the apparatus, which I now consider to represent the best embodiment thereof but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a pair of step-by-step repeater motors, and wireless means for causing one of said motors to follow the movements of the other of said motors in either of opposite directions.

2. In combination, an indicator, means responsive to radiant impulses of a given frequency for moving said indicator step-by-step in one direction, and means responsive to radiant impulses of another frequency for moving said indicator step-by-step in another direction.

3. A repeater system for aerial ordnance control comprising the combination with a ship's bearing indicator of a wireless sending instrument controlled thereby, a repeating indicator adapted to be mounted on an aircraft, a repeater motor for actuating the same, and a wireless receiving device adapted to control the energization of said motor.

4. A repeater system for aerial ordnance control comprising the combination with a ship's bearing indicator, of wireless transmission means controlled thereby, means for automatically varying the frequency of the wireless impulses in accordance with the direction of movement of said indicator, a repeating indicator adapted to be mounted on an aircraft, and means responsive to said impulses for actuating said repeating indicator in accordance with the movement of said ship's bearing indicator.

5. A repeater system for aerial ordnance control comprising the combination with a ship's bearing indicator of a step-by-step repeater motor controlled thereby, wireless transmission means, follow-up means interposed between said motor and said means for effecting the control of said means by said motor, a repeating indicator adapted to be mounted on an aircraft, and means responsive to wireless impulses for controlling said repeating indicator.

6. A repeater system for aerial ordnance control comprising the combination with a ship's bearing indicator of wireless transmission means controlled thereby, a repeating indicator adapted to be mounted on shipboard, and means responsive to wireless impulses for causing movement of said indicator.

7. In combination with an indicator, a repeater motor controlled thereby, a follow-up motor controlled by said repeater motor, and wireless transmission means controlled by said follow-up motor.

8. In combination with a repeater motor, a follow-up motor controlled thereby, means controlled by said follow-up motor for transmitting wireless impulses, and means controlled by said follow-up motor for varying the frequency of said impulses.

9. A repeater system for aerial ordnance control comprising the combination with a ship's bearing indicator of means controlled thereby for sending wireless impulses, means controlled by said indicator for automatically varying the frequency of said impulses, a repeating indicator adapted to be mounted on an aircraft, and means responsive to said impulses for actuating said repeating indicator.

10. The combination with a ship's gyroscopic compass having a transmitter, of a wireless sending instrument adapted to be actuated therefrom, comprising a repeater motor connected to said transmitter, reversing contacts actuated thereby, a reversible motor also connected thereto and in circuit therewith and radio-impulse transmission means actuated by said reversible motor.

11. The combination with a ship's gyroscopic compass having a transmitter, of a wireless sending instrument adapted to be actuated therefrom, and a wireless receiving instrument adapted to be located on an aircraft and actuated from said sending instrument including an indicator showing the heading of the ship on which said compass is mounted.

12. The combination with a ship's gyroscopic compass having a transmitter, of a wireless sending instrument adapted to be actuated therefrom, comprising a repeater motor connected to said transmitter, contacts actuated thereby, a second motor also connected thereto and in circuit therewith and radio-impulse transmission means actuated by said second motor.

In testimony whereof I have affixed my signature.

ELMER A. SPERRY.